United States Patent [19]

Nishikawa et al.

[11] Patent Number: 4,988,479
[45] Date of Patent: Jan. 29, 1991

[54] METHOD FOR PRODUCING A COMPOSITE MATERIAL

[75] Inventors: Ryuji Nishikawa; Hideya Takahashi; Norio Shinoda, all of Shizuoka, Japan

[73] Assignee: Yamaha Corporation, Japan

[21] Appl. No.: 416,844

[22] Filed: Oct. 4, 1989

[30] Foreign Application Priority Data

Oct. 6, 1988 [JP] Japan .................................. 63-252667
Oct. 6, 1988 [JP] Japan .................................. 63-252668
Dec. 13, 1988 [JP] Japan .................................. 63-314674

[51] Int. Cl.$^5$ ............................................. B22F 7/00
[52] U.S. Cl. .......................................... 419/8; 419/38; 419/49; 419/67; 419/68
[58] Field of Search .................... 419/8, 49, 38, 67, 68

[56] References Cited

U.S. PATENT DOCUMENTS 3,884,729 5/1975 Jackson et al. ................. 198/11.5 A
4,195,481 3/1979 Gupta et al. .......................... 428/678
4,683,118 7/1987 Hayashi et al. ........................ 419/23

Primary Examiner—Stephen J. Lechert, Jr.
Attorney, Agent, or Firm—Ostrolenk, Faber, Gerb & Soffen

[57] ABSTRACT

In production of a composite material such as an elongated Ti-base composite material advantageously used for eyeglass frames, a crude composite material formed by application of at least one surface layer of a component material to a base block by means of spraying processing is subsequently subjected to pressure application preferably with heat. A multi-layer construction can be easily obtained even starting from a base block of an intricate surface configuration thanks to employment of the spraying process, and the final pressure application assures strong diffusion bonding between the core block and the surface layers. The base block may be given in the form of a mold to be ultimately removed from the product.

19 Claims, 3 Drawing Sheets 4,988,479

METHOD FOR PRODUCING A COMPOSITE MATERIAL

BACKGROUND OF THE INVENTION

The present invention relates to method for producing a composite material, and more particularly relates to an improvement in production of a composite material such as a Ti-base composite material generally used for eyeglass frames.

Clad materials are typical example of a composite material made up of two or more different component materials bonded together in a superimposed disposition. For production of such a clad material, the component materials are conventionally bonded together by means of casting, welding, plasma spraying, blazing, dispersion, pressing, extrusion or detonation bonding.

In production of a composite material, there are lots of process and quality demands in the field of the art. In the first place, the process is required to assure multi-layer construction of the product with sufficient inter-layer bonding strength. Next, low cost production is strongly required even in the case of an intricate configuration of the product.

None of the above-described conventional processes could not well suffice these demands all together. That is to say, each of the processes was good for neither one demand nor the other.

SUMMARY OF THE INVENTION

It is the basic object of the present invention to produce a composite material at low production cost, with high inter-layer bonding strength and with possibility of forming a multi-layer construction even on an intricate configuration of the base material.

In accordance with the basic aspect of the present invention, one or more surface layers of different component materials are formed on a base block by means of spraying process to obtain a crude composite material, and pressure is applied to the crude composite material.

DESCRIPTION OF THE PREFERRED EMBODIMENTS

The first embodiment of the method in accordance with the present invention is shown in FIGS. 1 through 5, in which three surface layers of different component materials are sequentially formed on a base block to obtain a crude composite material and the crude composite material is then subjected to hot hydrostatic pressing to obtain a composite material.

Figure 1:
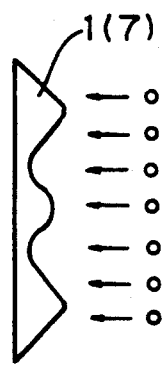
FIGS. 1 to 4 are sectional side view of sequential steps in one embodiment of the method in accordance with the present invention.

To begin with, a base block 1 such as shown in FIG. 1 is subjected to preliminary blasting for surface cleaning. Although the illustrated base block 1 takes the form of a plate with a corrugated surface, it may take the form of various rods, cylinders, blocks and plates. Preferably, the material for the base block exhibits thermal expansion close to that or those of the component material or materials for a surface layer or layers to formed on the base material. Sands or fine metal particles are preferably used for blasting. In addition to the surface cleaning, the blasting brings about adjusted surface roughness for better deposition of the sprayed component material or materials.

Figure 2:
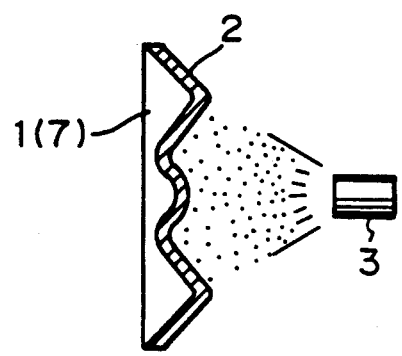

Next, the first surface layer 2 is formed on the base block 1 by spraying molten metal or ceramic powder as shown in FIG. 2. Plasma spraying process is here preferably employed in which molten component material is sprayed by a plasma spray gun 3. Powder of the component material is introduced, being entrained on carrier gas, into high frequency plasma generated by high frequency induction or into DC plasma generated by heat exchange between DC arc and plasma gas. After melting in the plasma, the component material is sprayed onto the base material 1 for formation of the first surface layer 2. Although inert gas such as argon is most preferably used for the carrier gas, nitrogen can be used also. For the purpose of preventing oxidization of the first surface layer, spraying is preferably carried out in an inert environment of these gases or in a reductive environment of low pressure hydrogen.

Figure 3:
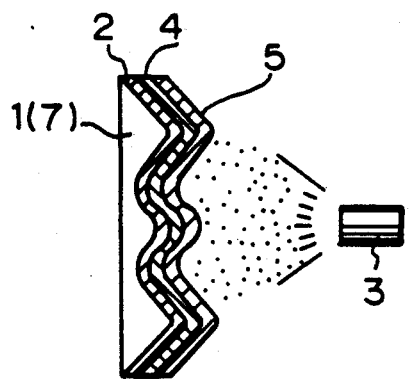

Further, as shown in FIG. 3, the second surface layer 4 is formed on the first surface layer 2 by spraying a composite material different from that for the first surface layer 2. Then the third surface layer 5 is formed on the second surface layer 4 from a composite material different from that for the second surface layer 4. In this way, at least two surface layers of different composite materials can be formed in superimposition even on a base material 1 having a intricate surface configuration.

Figure 4:
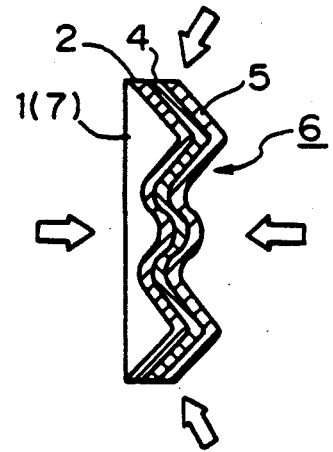

A crude composite material so obtained is then subjected to hot hydrostatic pressing as shown in FIG. 4 to form a composite material 6 of the present invention. To this end, the crude composite material is placed in a high pressure and high temperature furnace (not shown) with use of an inert gas such as argon and helium for the pressure medium filled in the furnace. Preferably, the pressing is carried out at a temperature from 0.5 to 0.7 mp °C., mp being the melting point of a material which has the lowest melting point among the base and component material used for formation of the crude composite material under a pressure from 50 to 180 MPa, for a period of 0.5 to 4 hr. As concerns the temperature, "mp" indicates the melting point of a material which has the lowest melting point among the base and component materials used for formation of the crude composite material.

Application of the hot hydrostatic pressing produces dispersion bonding between the base and component materials which is by far higher in bonding strength than the conventional mechanical bonding.

Figure 5:
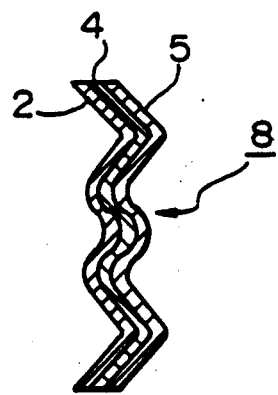
FIG. 5 is a sectional side view of a composite material produced by another embodiment of the method in accordance with the present invention.

The second embodiment of the present invention is different from the first embodiment in that the base block is finally removed from the product. More specifically, the base material takes the form of a model 7 having a surface configuration to be carried over to the product. As shown in FIGS. 2 to 4, the first to third surface layers 2, 3 and 4 are formed on the model 7 by means of spraying process and, after the hot hydrostatic pressing, the model 7 is removed to obtain a composite material 8 such as shown in FIG. 5.

Preferably, the material for the model 7 should exhibit thermal expansion by far greater than that of the material for the first surface layer 2 for easy removal of the model 7 after hot hydrostatic pressing by means of abrupt cooling. By properly selecting the material for the model 7, no preliminary coating of the model 7 with mold releasing agent is necessitated. More specifically, alumina or ceramics is preferably used for the model. When ceramic is used for the model 7, an alkali solution can be used for its removal. Since the surface layers 2, 4 and 5 are finally removed from the model 7, no initial surface flasting is required.

In practical application, the method in accordance with the present invention is most advantageously used for a Ti-base composite material for eyeglass frames.

Ti-base materials have recently experienced increased use in the field of high class eyeglass frames because of their high corrosion resistance, high mechanical strength and light weight. Despite these excellent properties, the Ti-base materials are in general quite unsuited for blazing and plating which are both indispensable in production of eyeglass frames. In an attempt to cover such demerits, it is conventionally proposed to combine a Ti-base material core with a Cu-base alloy or Ni-base alloy sheath by means of cladding since these alloys are well suited for blazing and plating. It is also widely employed to plate a Ti-base material core with precious metals.

In a typical process of cladding, on elongated Ti-base material core is inserted into an alloy cylinder and, after vacuum sealing, the combination is subjected to hot hydrostatic pressing for clad bonding of the core with the sheath. After the pressing, the combination is formed into a thin wire by means of hydrostatic extrusion.

For smooth insertion of the core into the sheath, a small gap must be left between the facing surfaces of the two components. At the hot hydrostatic pressing, however, presence of such a gap allows development of many, fine wrinkles on the outer surface of the sheath, i.e. the alloy cylinder. Since the configuration of the core is changed following the inner surface of the sheath, removal by cutting of the wrinkles on the outer surface of the sheath would partially expose the core outside the sheath. The wrinkles developed during the hot hydrostatic pressing may be more or less removed or diversed during the wiring process, such a process design is much complicated in particular when directly connected to the cladding process. In addition, the core is manually inserted into the sheath and presence of such a manual operation tends to contaminate the outer surface of the core. Poor bonding between the core and sheath caused by contamination would induce accidental separation of the core and sheath during the wiring process.

In accordance with the present invention, formation of one or more surface layers is introduced into production of a Ti-base composite material for eyeglass frames.

Figure 6:
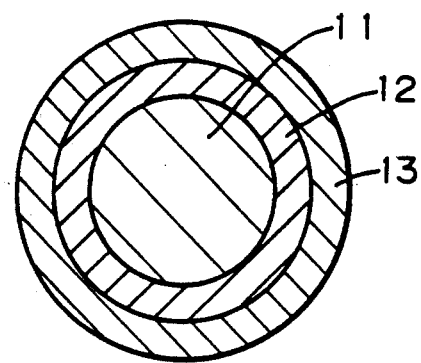
FIGS. 6 and 7 are transverse sectional views of composite materials produced by the other embodiments of the method in accordance with the present invention.

In the first place, as shown in FIG. 6, an intermediate layer 12 is formed on an elongated core 11 by means of spraying process and a sheath 13 is combined therewith by means of cladding process. The core 11 is made of a Ti-base material whereas the sheath 13 is made of a Ni-base material which is well suited for blazing and plating. The intermediate layer 12 is used for bonding the core 11 to the sheath 13, and mode of a material which exhibits good solid diffusion with Ti contained in the core 11 and generates no inter-metallic compounds in reaction with Ti. Preferably, the intermediate layer 12 is made of Mo, Nb, Ta and alloys of two of these metals.

Figure 7:
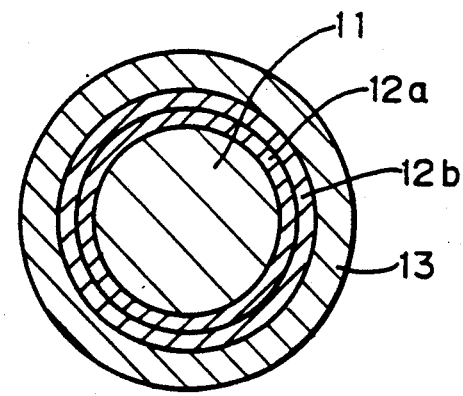

As shown in FIG. 7, two intermediate layers 12a and 12b may be made on the core 11. In this case, the second intermediate layer 12b is preferably made of a Cu-base material for stronger bonding between the core and the sheath. Three or more intermediate layers may be formed depending on quality demand for the product.

The intermediate layer 12 so formed is very porous in construction and, as a consequence, pores in the intermediate layer 12 are filled with fine metal particles during the hot extrusion, thereby preventing development of wrinkles on the surface of the sheath 13.

In the hot extrusion, the crude composite material is preferably subjected first to preliminary heating at a temperature of about 600° C. for a period from 1 to 2 hr. and to hot extrusion at a temperature from 800° to 900° C. Cladding of the core 11 with the sheath 13 and wiring of the crude composite material are carried out concurrently during the hot extrusion, thereby simplifying the entire process greatly.

In the other embodiment of the present invention applied to production of a Ti-base composite material for eyeglass frames, a surface layer is formed on a core made of a Ti-base material by means of spraying process, the combination of the core with the surface layer is encased in a capsule, the gap around the combination within the capsule is filled with metallic powder, the capsule is subjected to cold hydrostatic pressing after vacuum sealing, the metallic powder within the capsule is sintered, the capsule is subjected to hot extrusion for wiring and the capsule is removed.

The capsule is preferably given in the form of a pipe made of soft steel. Preferably, a Ni-base materials is used for the metallic powder to be filled in the capsule because of its good fitness to blazing and plating. Sintering is carried out at a temperature from 800° to 900° C. for a period of 1 to 2 hr.

EXAMPLES

EXAMPLE 1

Figure 8:
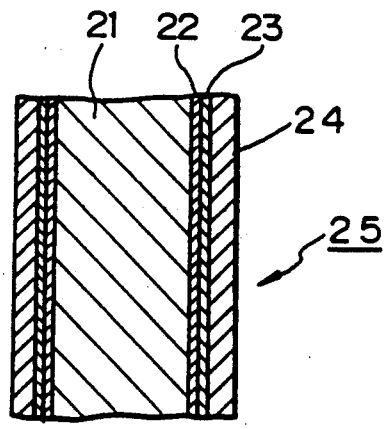
FIG. 8 is a sectional side view of a composite material produced in Example 1.

A Ti base block 21 such as shown in FIG. 8 was prepared. This base block 21 was 50 mm in outer diameter and 500 mm in length. The surface of the base block was blasted with sand.

First, Mo particles of 30 to 70 μm diameter were applied to the base block 21 by means of plasma spraying process to form the first surface layer 22 of 0.5 mm thickness. Spraying was carried out at a vacuum degree of 20 to 60 Torr. and with a spraying distance of 100 to 150 mm. Next, Cu particles of 45 to 90 μm diameter were applied by means of vacuum plasma spraying process to form the second surface layer 23 of 0.5 mm thickness, and Ni particles of 10 to 45 μm diameter were similarly applied to form the third surface layer 24 of 1.5 mm thickness, both under same conditions as in the case of the first surface layer 22.

A crude composite material thus obtained was subjected to hot hydrostatic pressing in an argon environment at a temperature of about 1000° C., under a pressure of about 180 MPa for a period of 2 hr.

By a test after production, presence of high bonding strength between the base block and the surface layers in a composite material 25 was confirmed.

EXAMPLE 2

Figure 9:
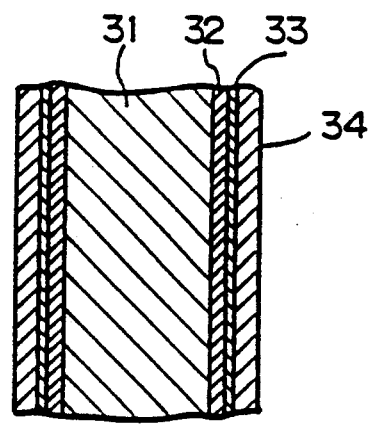
FIG. 9 is a sectional side view of a crude composite material prepared in Example 2.

A stainless steel model 31 such as shown in FIG. 9 was prepared. This model 31 was 40 mm in outer diameter and 200 mm in length.

First, alumina gas atomized particles were applied to the model 31 by means of vacuum plasma spraying process to form the first surface layer 32 of 1.0 mm thickness. Spraying was carried out under conditions same as in Example 1. Next, Cu particles of 45 to 90 μm diameter were applied by means of vacuum plasma spraying process to form the second surface layer 33 of 0.5 mm thickness and Ni particles of 10 to 45 μm diameter were similarly applied to form the third surface layer 34 of 1.5 mm thickness.

Figure 10:
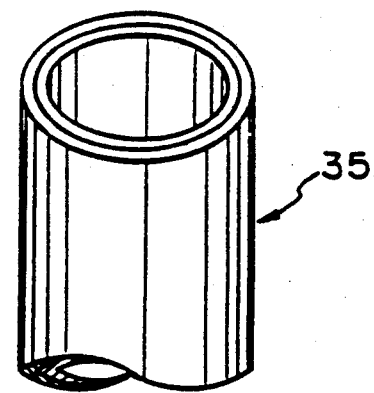
FIG. 10 is a perspective view of a composite material produced in Example 2.

A crude composite material thus obtained was subjected to hot hydrostatic pressing in an argon environment at a temperature of about 1000° C., under a pressure of about 180 MPa for a period of 2 hr. The model 31 was removed utilizing difference in degree of thermal expansion between the model 31 and the first surface layer 32 which was also removed by means of cutting to obtain a cylindrical composite material 35 such as shown in FIG. 10.

By a test after production, presence of high bonding strength between the surface layers was confirmed.

EXAMPLE 3

A Ti billet was used for the core 11 having a diameter of 92 mm and a length of 1000 mm. After application of blasting, Mo gas atomize particles of 30 to 75 μm diameter ware applied to the Ti core 11 by means of cold plasma spraying process to form a Mo intermediate layer 12a of 0.5 mm thickness. Next, Cu gas atomize particles of 45 to 90 μm diameter ware applied onto the Mo intermediate layer 12a by mean of cold plasma spraying process to form a Cu intermediate layer 12b of 0.5 mm thickness. A combination of the Ti core with the Mo and Cu intermediate layers was inserted into a sheath 13 made of a Ni-Cr alloy. The sheath was 97 mm in inner diameter and 3 mm in wall thickness. After vacuum sealing and preliminary heating at 600° C. for 1 hr., the crude composite material was subjected to hot extrusion at 900° C. to obtain a Ti composite material of 60 mm diameter. No surface wrinkles were observed on the product.

Figure 11:
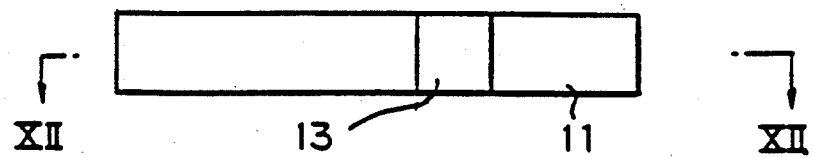
FIG. 11 is a plan view of a sample used in Example 3.
Figure 12:
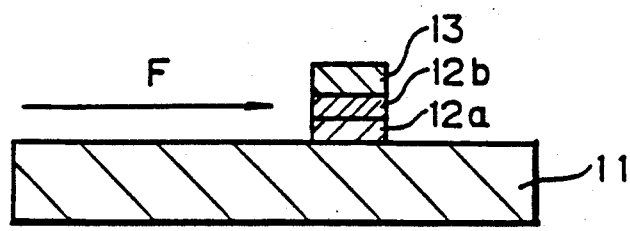
FIG. 12 is a sectional view of the sample taken along a line X II—X II in FIG. 11.

Five samples were prepared as shown in FIGS. 11 and 12. In preparation of each sample, a Ti composite material produced was cut into a rod of 20 mm. Next, the intermediate layers and the sheath were partly removed so as to leave a local test projection of 3 mm length. The diameter of the core 11 was 5 mm. A shearing force F was applied to the test projection for measurement of the shearing strength and the result is shown in Table 1.

For comparison, a Ti billet of 92 mm diameter and 1000 mm length was inserted sequentially into a Mo pipe of 92 mm inner diameter and 0.5 mm wall thickness, a Cu pipe of 92.5 mm inner diameter and 0.5 mm wall thickness, and a Ni-Cr alloy pipe of 93 mm inner diameter and 3 mm wall thickness. A combination thus obtained was subjected to hot hydrostatic pressing at a temperature of 1000° C., under a pressure of 180 MPa for a period of 2 hr. for cladding. Next, hydrostatic extrusion was carried out under a pressure of 900 MPa to obtain a Ti composite material of 60 mm diameter. Shearing strength tests were carried out in a manner same as in the case of the samples of the present invention. The results are also shown in Table 1.

TABLE 1

| sample | shearing strength inventional | (GPa) comparative |
| --- | --- | --- |
| 1 | 0.243 | 0.231 |
| 2 | 0.285 | 0.214 |
| 3 | 0.301 | 0.193 |
| 4 | 0.274 | 0.222 |
| 5 | 0.254 | 0.245 |
| average | 0.271 | 0.221 |

*Shearing strength = (Load in kg. when the test projection was taken off the core)/(Surface area in mm² of the test projection)

It is clear from the data that the bonding strength between the core and the sheath was much raised by employment of the method in accordance with the present invention. Further, no substantial presence of wrinkles on the product was confirmed.

EXAMPLE 4

A Ti billet was used for the core 11 having a diameter of 92 mm. and a length of 1000 mm. After application of blasting, Mo gas atomize particles of 30 to 75 μm were applied to the Ti core 11 by means of cold plasma spraying process to form a Mo intermediate layer 12a of 0.5 mm. thickness. Next, Cu gas atomize particles of 45 to 90 μm diameter were applied onto the Mo intermediate layer 12a by means of cold plasma spraying process to form a Cu intermediate layer 12b of 0.5 mm thickness. A combination of the Ti core with the Mo and Cu intermediate layers was placed on the center axis in a soft steel capsule which was 97 mm in inner diameter and 3 mm in wall thickness. A gap between the combination and the capsule was filled with Ni-Cr alloy powder. After vacuum sealing, the capsule was heated at a temperature from 800° to 900° C. for 1 hr. for sintering purposes. After subsequent preliminary heating, the capsule was subjected to hot extrusion at 900° C. to obtain a wire of 60 mm diameter. Then the capsule was removed to obtain a Ti composite material. No surface wrinkles were observed on the product.

Five samples were prepared and subjected to a shearing test just as in the preceding Example. Comparative samples were prepared also just as in the preceding Example. The results are shown in Table 2.

TABLE 2

| 1 | 0.313 | 0.231 |
| --- | --- | --- |
| 2 | 0.272 | 0.214 |
| 3 | 0.293 | 0.193 |
| 4 | 0.285 | 0.222 |
| 5 | 0.296 | 0.245 |
| average | 0.292 | 0.221 |

It is again clear from the data that the bonding strength between the core and the sheath was significantly raised by employment of the method in accordance with the present invention. Further, no substantial presence of wrinkles on the product was confirmed.

We claim:

1. A method for producing a composite material, comprising the steps of:
    forming at least one surface layer on an elongated core forming a base block made of Ti-base material by spraying on the core different component materials to obtain a crude composite material which forms an intermediate layer on the core;
applying pressure to said crude composite material; and
bonding a sheet made of Ni-base material to said intermediate layer by cladding.

2. Method as claimed in claim 1 in which
the material for said base block has a degree of thermal expansion close to those of said component materials for said surface layers.

3. Method as claimed in claim 1 in which
said base block is a model which is removed after application of pressure to said crude composite material.

4. Method as claimed in claim 3 in which
the material for said model has a degree of thermal expansion far higher than that of said component material for a surface layer.

5. Method as claimed in claim 1 in which
said spraying process is plasma spraying process.

6. Method as claimed in claim 5 in which
powder of said component material is introduced into plasma gas by means of carrier gas.

7. Method as claimed in claim 6 in which
inert gas is used for said carrier gas.

8. Method as claimed in claim 1 in which
pressure application is carried out by means of hot hydrostatic pressing.

9. Method as claimed in claim 8 in which
said hot hydrostatic pressing is carried out at a temperature of 0.5 to 0.7 mp C., mp being the melting point of a material which has the lowest melting point among said base and component material used for formation of said crude composite material.

10. Method as claimed in claim 8 in which
said hot hydrostatic pressing is carried out under a pressure of 50 to 180 MPa.

11. Method as claimed in claim 8 in which
said hot hydrostatic pressing is carried out for a period of 0.5 to 4 hr.

12. Method as claimed in claim 1 in which
said intermediate layer is made of a material which exhibits good solid diffusion with Ti and generates no inter-metallic compounds in reaction with Ti.

13. Method as claimed in claim 12 in which
said intermediate layer is made of a material selected from a group consisting of Mo, Nb, Ta and alloys of two of these metals.

14. Method as claimed in claim 1 in which
two intermediate layers are formed on said core,
a first intermediate layer is made of a material which exhibits good solid diffusion with Ti and generates no intermetallic compounds in reaction with Ti, and
a second intermediate layer is made of a Cu-base material.

15. Method as claimed in claim 1 in which
said base block is an elongated core made of Ti-base material,
at least one surface layer is formed on said core by means of spraying process,
the combination of said core with said surface layer is encased in a capsule,
a gap around said combination is filled with metallic powder, said capsule is subjected to cold hydrostatic pressing, said metallic powder within said capsule is sintered, and said capsule is removed after hot extrusion for wiring.

16. Method as claimed in claim 3 in which
said spraying process is plasma spraying process.

17. Method as claimed in claim 3 in which
pressure application is carried out by means of hot hydrostatic pressing.

18. A method for producing a composite material, comprising the steps of:
forming at least one surface layer on an elongated core forming a base block made of Ti-base material by spraying on the core different component materials to obtain a crude composite material which forms an intermediate layer on the core;
encasing a combination of said core with said intermediate surface layer in a capsule;
filling metallic powder into a gap between said combination and said capsule;
subjecting said capsule to cold hydrostatic pressing;
centering said metallic powder within said capsule; and
subjecting said capsule to hot extrusion for wiring and removing said capsule.

19. Method as claimed in claim 17 in which
a Ni-base material is used for said powder to be filled into said capsule.

* * * * *